United States Patent
Hoch

(10) Patent No.: US 7,021,530 B2
(45) Date of Patent: Apr. 4, 2006

(54) SYSTEM AND METHOD FOR MANAGING AND PROCESSING STORED-VALUE CARDS AND BILL PAYMENT THEREFROM

(75) Inventor: Louis A. Hoch, San Antonio, TX (US)

(73) Assignee: Payment Data Systems, Inc., San Antonio, TX (US)

( * ) Notice: Subject to any disclaimer, the term of this patent is extended or adjusted under 35 U.S.C. 154(b) by 0 days.

(21) Appl. No.: 11/065,389

(22) Filed: Feb. 24, 2005

(65) Prior Publication Data

US 2005/0184146 A1  Aug. 25, 2005

Related U.S. Application Data

(60) Provisional application No. 60/547,696, filed on Feb. 25, 2004.

(51) Int. Cl.
G07F 19/00 (2006.01)
G06Q 40/00 (2006.01)

(52) U.S. Cl. .......................... 235/379; 705/40
(58) Field of Classification Search ................ 235/379, 235/380, 382; 705/16, 17, 35, 40, 41; 902/24, 902/41

See application file for complete search history.

(56) References Cited

U.S. PATENT DOCUMENTS

| 5,754,655 A | * | 5/1998 | Hughes et al. | 705/70 |
| 6,078,907 A | * | 6/2000 | Lamm | 705/40 |
| 6,349,290 B1 | * | 2/2002 | Horowitz et al. | 705/35 |

* cited by examiner

Primary Examiner—Michael G. Lee
Assistant Examiner—Jamara A. Franklin
(74) Attorney, Agent, or Firm—Michelle Evans; Gunn & Lee, P.C.

(57) ABSTRACT

A system and method for managing and processing stored-value debit, check card, signature debit, PIN based card or automatic teller machine (ATM) cards and bill payment from a variety of access points. Enrollment occurs between a card issuer and a card holder resulting in issuance of the card. When using the card, the cardholder will input the card into an input device. Cardholder information is routed to an initial network and then to the ATM/debit network. The information is then sent to the issuer. The issuer verifies the transaction to the input device and prompts the cardholder with options. For bill payment, the cardholder is provided a list of billers. The cardholder selects the appropriate biller and inputs all necessary information. A transaction is created to debit the cardholder's electronic account and credit the biller's account. This information is then routed to biller and confirmation is provided by the input device.

20 Claims, 7 Drawing Sheets

SYSTEM AND METHOD FOR MANAGING AND PROCESSING STORED-VALUE CARDS AND BILL PAYMENT THEREFROM

This application claims priority of U.S. Provisional Application Ser. No. 60/547,696 filed Feb. 25, 2004.

BACKGROUND OF THE INVENTION

1. Field of the Invention

The present invention relates to a system and method for managing and processing stored-value debit, check card, signature debit, PIN based card or automatic teller machine (ATM) cards and bill payment from a variety of access points using this system and method. This invention is targeted to both the banked and un-banked community of consumers.

2. Background Information

There are approximately forty million un-banked consumers in the United States plus millions more banked consumers. These un-banked and similarly many banked consumers are individuals that have chosen not to use the traditional bank facilities, such as checking and savings accounts, for a variety of personal reasons ranging from legal documentation requirements to credit problems to aversion of paying fees for these services. Generally when one of these consumers receives his or her salary, he or she typically proceeds to a check cashing retail outlet to cash the check. In such a situation, the consumer pays a check cashing fee and receives the balance in cash. From this cash, all disbursements for living expenses and bills are made.

By choosing not to use banking services, the un-banked consumer limits his or her options for bill payment. Many un-banked consumers desire a method whereby they can exercise their right to not use a traditional banking facility, but maintain the convenience of such a service. There is a current need for technology to eliminate the lost time and inconvenience to these consumers. The present invention solves this problem. The present invention relates to a system and method for managing and processing stored-value debit, check card, signature debit, PIN based card or ATM cards and bill payment using this system and method along with these cards from a variety of access points, such as an Interactive Voice Response (IVR) system, counter payment at a retail location by a terminal or Internet, a kiosk, or ATM.

Stored-value cards are known in the art and can be issued without the formal opening of a bank account. The card can be a debit card that is usable at ATMs as well as retail point of sale purchases using a personal identification number (PIN) or signature. The card can also be an ATM card that is usable to withdraw cash from automatic teller machines worldwide.

SUMMARY OF THE INVENTION

It is a primary object of the present invention to provide a system and method for managing and processing stored-value debit, check card, signature debit, PIN based card or automatic teller machine (ATM) cards and bill payment from a variety of access points using the present system and method. Initially, an enrollment process occurs between a card issuer and a card holder either directly or indirectly, by way of a merchant or employer. The enrollment process may include the card holder providing bill payment account detail information for each biller the consumer wishes to forward bill payments to. At the end of the enrollment process, a stored-value card is issued to the cardholder. The stored-value card may have identifying information thereon, including, but not limited to, an identification number. In addition, the stored-value card may have a magnetic strip thereon encoded with identifying information. The name of the card issuer may also be indicated on the card.

When using the card, the cardholder will input information by way of the stored-value card into an input device. The cardholder information is then routed to a standard telephone network or to the internet. Once connected to the standard telephone network or internet, the cardholder information is routed to the ATM/debit network. The ATM/debit network then sends the information to the issuer. The issuer verifies the transaction and routes this information back to the input device. Once the cardholder is verified, the cardholder is then provided a number of options. These options include, but are not limited to, withdrawal, transfer, payment of bills and the like.

If bill payment is chosen, the cardholder is presented with a list of billers that he or she has identified during the initial enrollment process. The cardholder selects the biller for the bill he or she wishes to pay. The cardholder enters the amount due and may or may not enter the payment date. A transaction is created to deduct the amount due from the cardholder's electronic account and creates a credit to the biller's account. This information is then routed through to either a public bill pay network or a private bill pay network. The bill pay network will then forward this information to the indicated biller. Once the information is transmitted to biller, the input device presents cardholder with a confirmation once the transaction is complete. The process is repeated until all bills are paid.

DETAILED DESCRIPTION OF THE PREFERRED EMBODIMENT

Figure 1A:
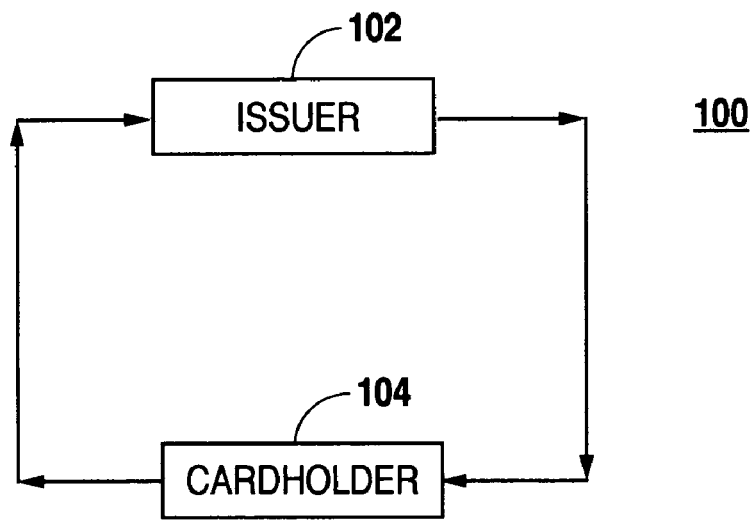
FIG. 1a is a schematic diagram of the enrollment phase of the present invention.

FIG. 1 is a schematic diagram of the enrollment phase of the present invention. The enrollment phase 100 involves the issuer 102 and the prospective card holder 104. During this enrollment phase 100, the issuer 102 provides enrollment forms to the prospective card holder 104. At this time a list of eligible billers 106 (See FIG. 2) that can be paid locally or nationally through the network or by check is provided to the prospective card holder 104. In addition, the issuer 102 provides security information, including but not limited to, a security PIN code, to the prospective card holder 104. The prospective card holder 104 selects the billers 106 (See FIG. 2) that he or she will pay electronically through the present system. If the cardholder 104 has a biller 106 that is not in the system, an option is given to add that biller 106. Once the new biller 106 is added, a unique number is established for that biller 106 and added to the biller database. At the end of the enrollment phase 100, the prospective card holder 104 is issued an activated stored-value card with bill payment capability.

Consumers can become cardholders 104 through a variety of means. One means is through an employer program. In such a program, an employer decides to deploy a payroll card program and establishes an employee enrollment program. The issuer 102 through prior agreement with an employer (See FIG. 1b) provides each enrolling employee a stored-value card and establishes criteria for security information, such as PINs, passwords, and other identifying information. The employer may also present during enrollment a list of billers 106 in their local area as well as typically national billers 106. On a payday, a cardholder 104 receives from their employer the credit amount of their payroll check in an electronic account. This credit amount adds to any existing balance already in the account. The account is then considered "funded". The cardholder 104 now has funds for which he or she can use to pay bills or withdraw funds.

Figure 1B:
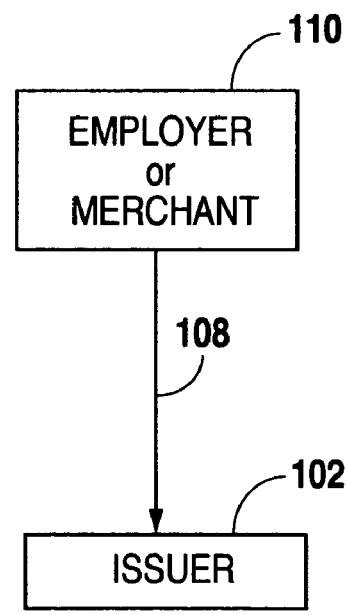
FIG. 1b is a schematic diagram of the enrollment phase of the present invention between a card issuer and an employer or merchant.

In a second scenario, a card issuer enters into an agreement with a merchant (See FIG. 1b). The merchant offers for sale cardholder packages which can be purchased by a consumer at a retail location. The cardholder packages either (1) include enrollment information that a consumer can send to issuers 102 in return for a stored-value card or (2) instantly provide a stored-value card to the consumer. The consumer may load the stored-value card with a dollar value at a participating merchant or by other means, such as by Automated Clearing House (ACH) or wire transfer.

Figure 2:
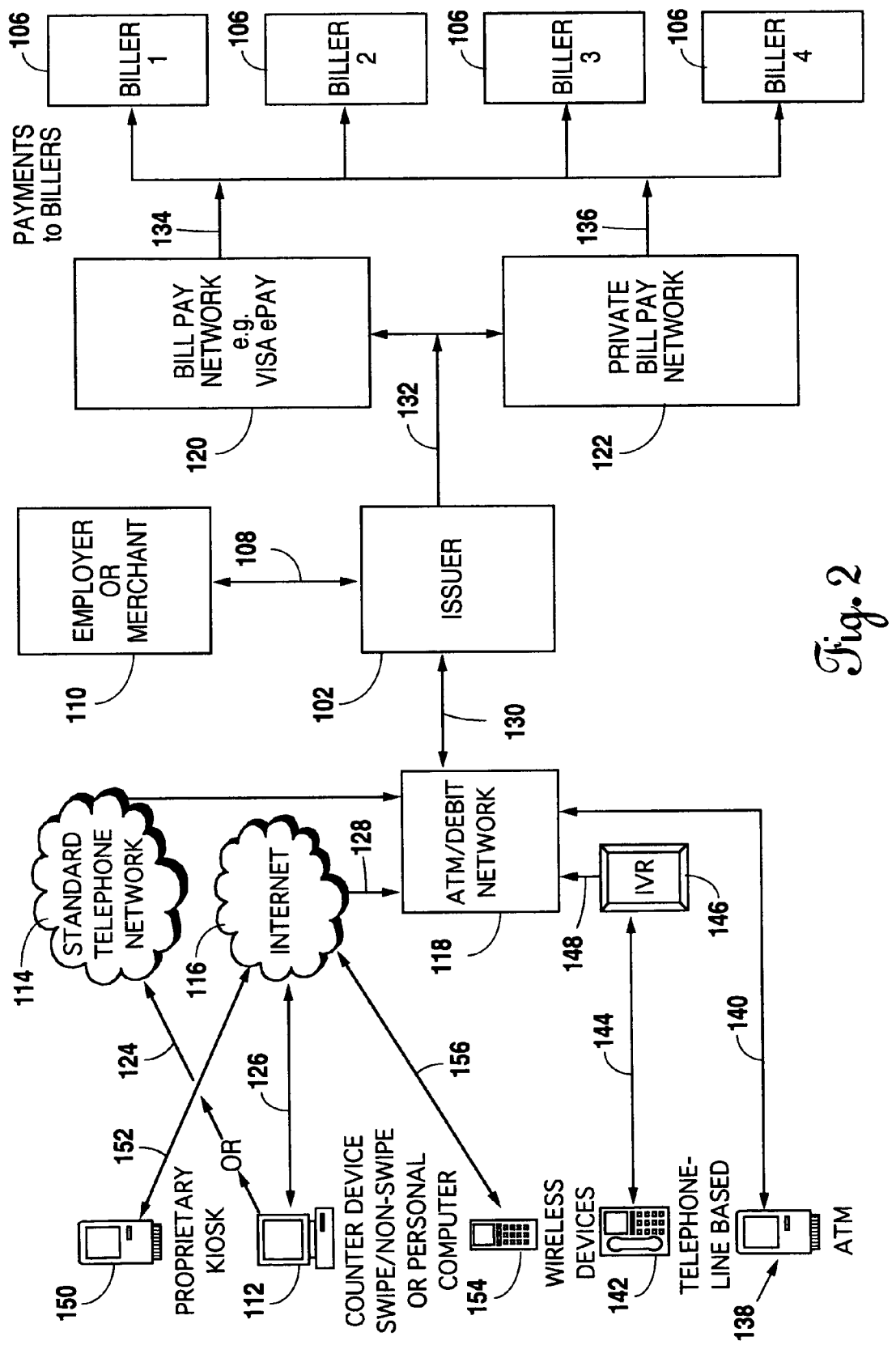
FIG. 2 is schematic diagram of the preferred embodiment of the present invention.
Figure 3:
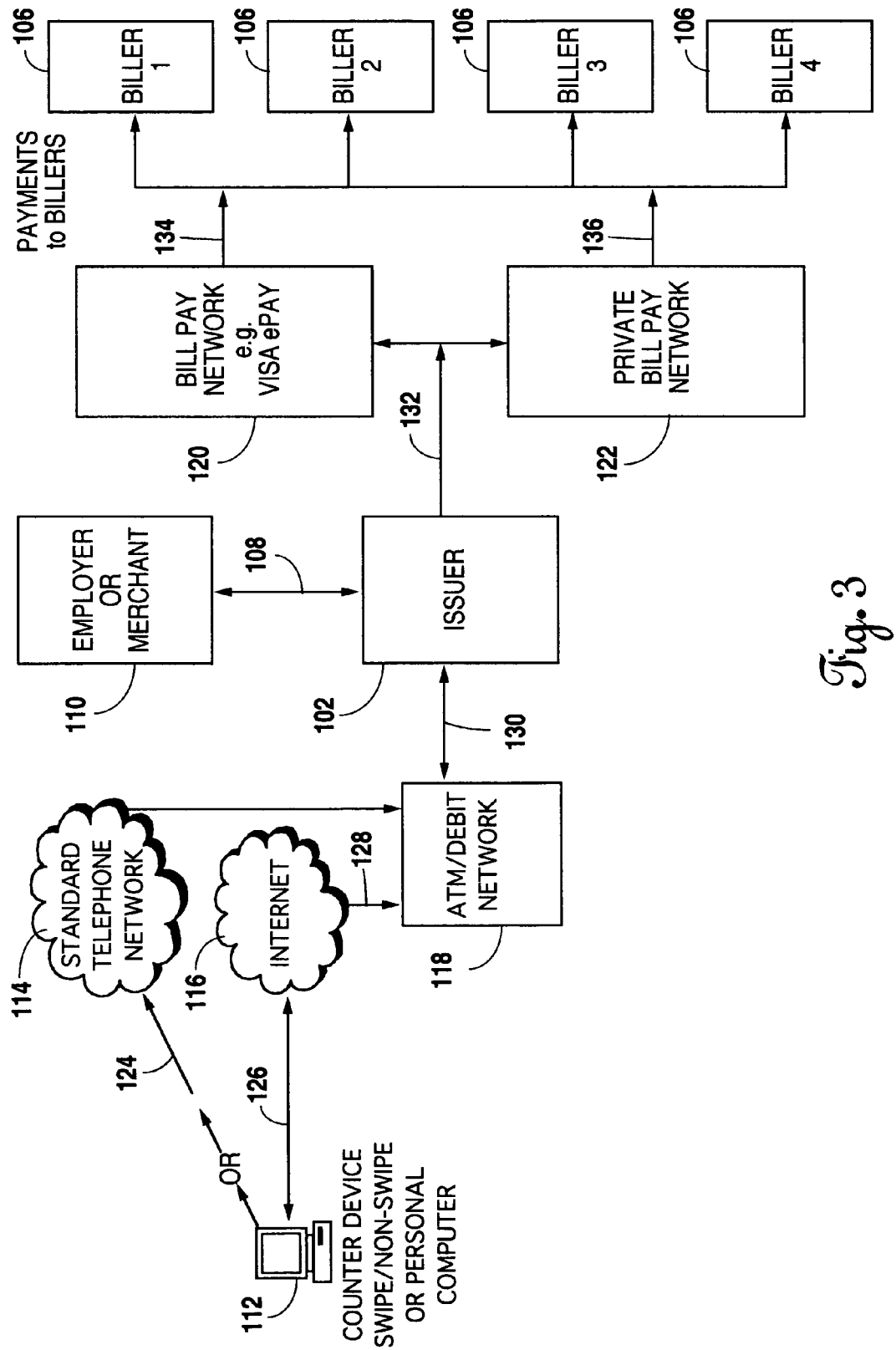
FIG. 3 is a schematic diagram of the preferred embodiment of the present invention utilizing a counter device with a swipe terminal or a non-swipe terminal or a personal computer with internet access as the card information input device.
Figure 4:
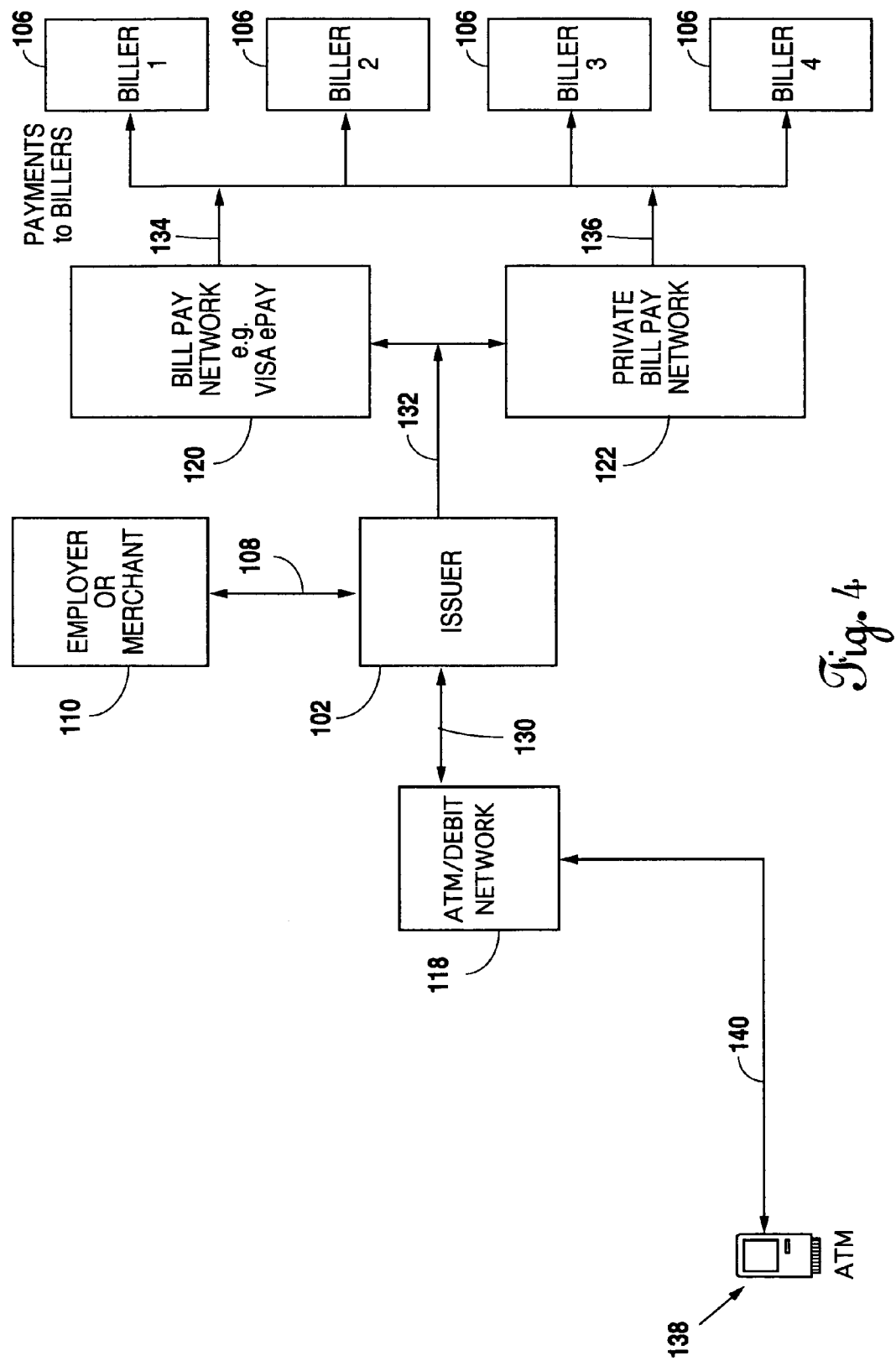
FIG. 4 is a schematic diagram of the preferred embodiment of the present invention utilizing an automatic teller machine as the card information input device.
Figure 5:
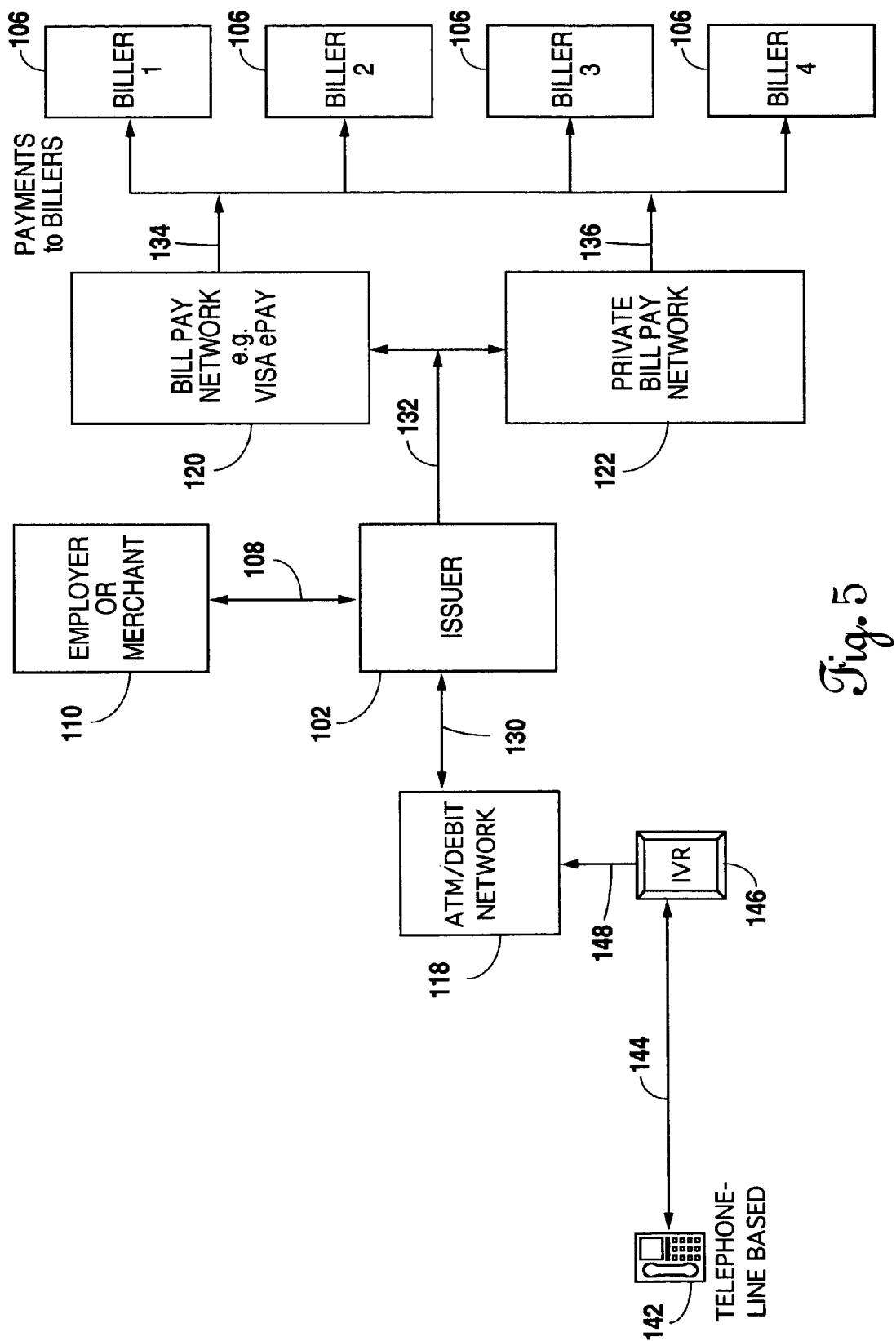
FIG. 5 is a schematic diagram of the preferred embodiment of the present invention utilizing an interactive voice response device as the input device.
Figure 6:
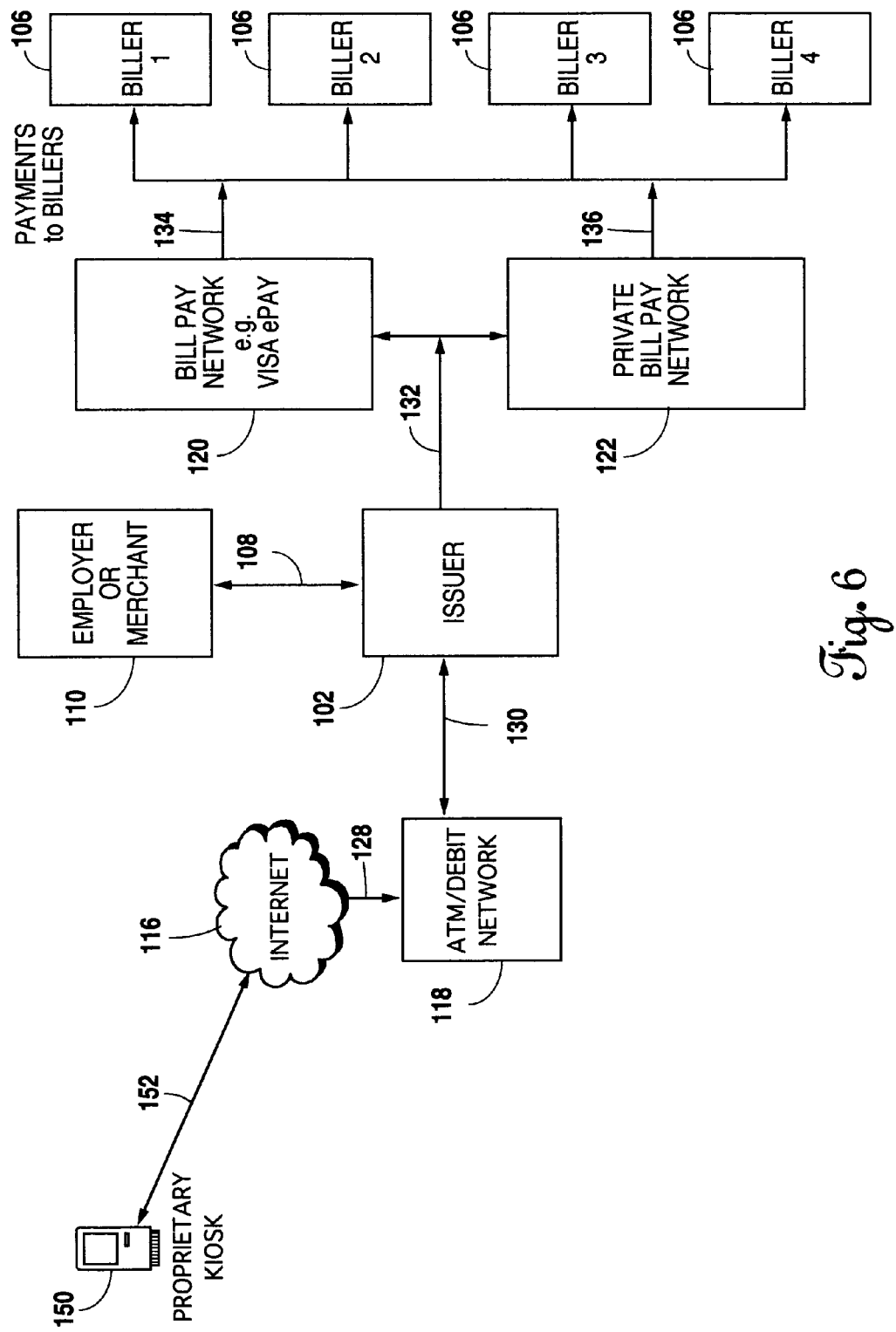
FIG. 6 is a schematic diagram of the preferred embodiment of the present invention utilizing a kiosk as the card information input device.
Figure 7:
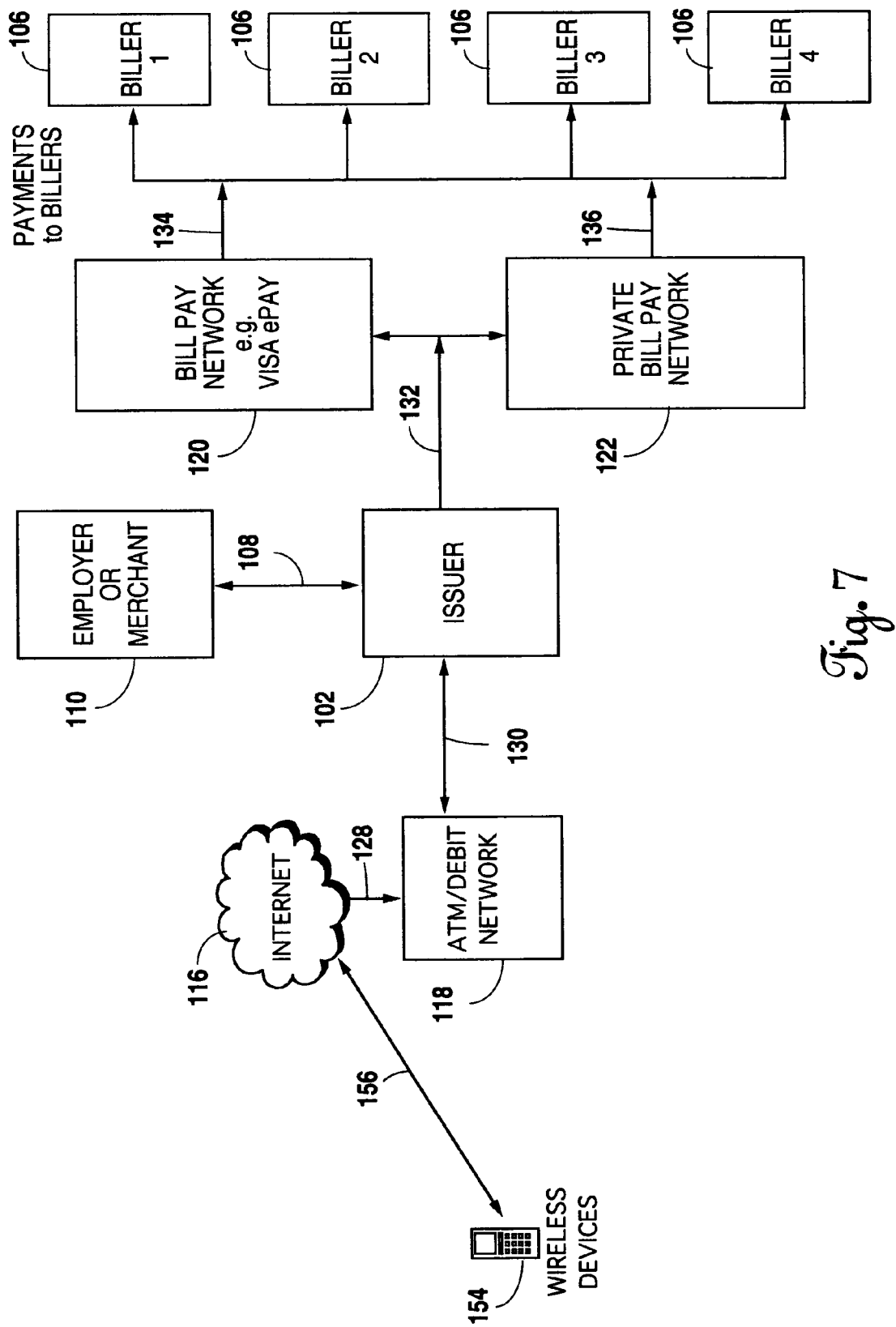
FIG. 7 is a schematic diagram of the preferred embodiment of the present invention utilizing an internet enabled wireless device as the card information input device.

FIG. 2 is schematic diagram of the preferred embodiment of the present invention. The cardholder 104 will utilize the present invention by inputting information by way of a stored-value card into an input device. The input device may be a counter device with a swipe terminal or a non-swipe terminal or a personal computer with internet access as the card information input device as illustrated in FIG. 3. In addition, the input device may be an automatic teller machine as indicated in FIG. 4. The input device may also be an interactive voice response device as illustrated in FIG. 5. Still, the input device may be a kiosk as shown in FIG. 6. And further, the input device may be an internet enabled wireless device as indicated in FIG. 7.

In FIG. 3 a schematic diagram of the preferred embodiment of the present invention utilizing a counter device with a swipe terminal or a non-swipe terminal or a personal computer with internet access as the card information input device is shown. In order to pay a bill at this stage, the cardholder 104 visits a participating outlet (retail center, convenience store, and the like) that has an ATM device capable of reading a stored-value card, presenting billers to be paid, and processing the resulting debits for the bills that are paid. To begin the transaction, the cardholder 104 inserts the card into a counter device with a swipe terminal at stage 112 (or a nonswipe terminal or personal computer with internet access). The counter device at stage 112 may be equipped with recognition software to recognize whether the card is from the present merchant or issued by another merchant. Generally, this recognition would be of the account number on the face of the card. If the card is not from the present merchant, a fee may be charged for access. The cardholder 104 is then prompted to enter a security code and/or other identifier(s). The cardholder 104 information is then routed through stage 124 to a standard telephone network 114 or through stage 126 to the internet 116. Once connected to the standard telephone network 114 or internet 116, the cardholder 104 information is routed to the ATM/debit network 118. The ATM/debit network 118 then sends the information to issuer 102. The issuer 102 verifies the transaction and routes this information back to stage 112. Once the cardholder 104 is verified at stage 112, the cardholder 104 is then provided a number of options. These options include, but are not limited to, withdrawal, transfer, payment of bills and the like.

If bill payment is chosen, the cardholder 104 is presented with a list of billers 106 that he or she has identified during the initial enrollment process (See FIG. 1a). The cardholder 104 selects the biller 106 for the bill he or she wishes to pay. The cardholder 104 enters the amount due and may or may not enter the payment date. A transaction is created to deduct the amount due from the cardholder's 104 electronic account and creates a credit to the biller's 106 account. This information is then routed through stage 132 to either an electronic bill pay network at 120 or a private bill pay network at 122. The bill pay network 120 or 122 will then forward this information to the indicated biller 106 at either stage 134 electronically or a paper check will be generated at stage 136 and forwarded by mail. Once the information is transmitted to biller 106, the counter device at stage 112 presents cardholder 104 with a confirmation receipt indicating that the transaction is complete. The process is repeated until all bills are paid.

FIG. 4 is a schematic diagram of the preferred embodiment of the present invention utilizing an automatic teller machine as the card information input device. The cardholder 104 visits an ATM device at stage 138 capable of reading a stored-value card, presenting billers to be paid, and processing the resulting debits for the bills that are paid. To begin the transaction, the cardholder 104 inserts the card into the ATM machine at stage 138. The ATM at stage 138 may be equipped with recognition software to recognize whether the card is from the present location or issued by another location. Generally, this recognition would be of the account number on the face of the card. If the card is not from the present location, a fee may be charged for access. The cardholder 104 is then prompted to enter a security code and/or other identifier(s). The cardholder 104 information is then routed through stage 140 to the ATM/debit network 118. The ATM/debit network 118 then sends the information to issuer 102. The issuer 102 verifies the transaction and routes this information back to stage 138. Once the cardholder 104 is verified at stage 138, the cardholder 104 is then provided a number of options. These options include, but are not limited to, withdrawal, transfer, payment of bills and the like.

If bill payment is chosen, the cardholder 104 is presented with a list of billers 106 that he or she has identified during the initial enrollment process (See FIG. 1a). The cardholder 104 selects the biller 106 for the bill he or she wishes to pay. The cardholder 104 enters the amount due and may or may not enter the payment date. A transaction is created to deduct the amount due from the cardholder's 104 electronic account and creates a credit to the biller's 106 account. This information is then routed through stage 132 to either an electronic bill pay network at 120 or a private bill pay network at 122. The bill pay network 120 or 122 will then forward this information to the indicated biller 106 at either stage 134 electronically or a paper check will be generated at stage 136 and forwarded by mail. Once the information is transmitted to biller 106, the ATM at stage 138 will present cardholder 104 with a confirmation receipt once the transaction is complete. The process is repeated until all bills are paid.

In FIG. 5 a schematic diagram of the preferred embodiment of the present invention utilizing an interactive voice response device as the input device is shown. To begin the transaction, the cardholder 104 dials a predetermined telephone number on a telephone line based device at stage 142. The telephone call is then routed through 144 to an interactive voice response (IVR) device at stage 146. The cardholder 104 is then prompted to enter the number of the card, a security code and/or other identifier(s) on the telephone keypad. Once entered, the cardholder 104 information is then routed through stage 148 to an ATM/debit network 118. The ATM/debit network 118 then sends the information to issuer 102. The issuer 102 verifies the transaction and routes this information back to stage 142. Once the cardholder 104 is verified at stage 142, the cardholder 104 is then provided a number of options. These options include, but are not limited to, withdrawal, transfer, payment of bills and the like, such options to be selected on the keypad of the telephone line based device.

If bill payment is chosen, the cardholder 104 is presented with a list of billers 106 that he or she has identified during the initial enrollment process (See FIG. 1a). The cardholder 104 selects the biller 106 for the bill he or she wishes to pay. The cardholder 104 enters the amount due and may or may not enter the payment date. A transaction is created to deduct the amount due from the cardholder's 104 electronic account and creates a credit to the biller's 106 account. This information is then routed through stage 132 to either an electronic bill pay network at 120 or a private bill pay network at 122. The bill pay network 120 or 122 will then forward this information to the indicated biller 106 at either stage 134 electronically or a paper check will be generated at stage 136 and forwarded by mail. Once the information is transmitted to biller 106, the telephone line based device at 142 returns to cardholder 104 a confirmation number once the transaction is complete. The process is repeated until all bills are paid.

FIG. 6 is a schematic diagram of the preferred embodiment of the present invention utilizing a kiosk as the card information input device. The cardholder 104 visits a location housing a kiosk input device capable of reading a stored-value card, presenting billers to be paid, and processing the resulting debits for the bills that are paid. To begin the transaction, the cardholder 104 inserts the card into a kiosk at stage 150. The cardholder 104 is then prompted to enter a security code and/or other identifier(s). The cardholder 104 information is then routed through stage 152 to the internet 116. Once connected to the internet 116, the cardholder 104 information is routed to the ATM/debit network 118. The ATM/debit network 118 then sends the information to issuer 102. The issuer 102 verifies the transaction and routes this information back to stage 150. Once the cardholder 104 is verified at stage 150, the cardholder 104 is then provided a number of options. These options include, but are not limited to, transfer, payment of bills and the like, such options selected at the kiosk.

If bill payment is chosen, the cardholder 104 is presented with a list of billers 106 that he or she has identified during the initial enrollment process (See FIG. 1a). The cardholder 104 selects the biller 106 for the bill he or she wishes to pay. The cardholder 104 enters the amount due and may or may not enter the payment date. A transaction is created to deduct the amount due from the cardholder's 104 electronic account and creates a credit to the biller's 106 account. This information is then routed through stage 132 to either an electronic bill pay network at 120 or a private bill pay network at 122. The bill pay network 120 or 122 will then forward this information to the indicated biller 106 at either stage 134 electronically or a paper check will be generated at stage 136 and forwarded by mail. Once the information is transmitted to biller 106, the kiosk at stage 150 presents cardholder 104 with a confirmation receipt once the transaction is complete. The process is repeated until all bills are paid.

In FIG. 7 a schematic diagram of the preferred embodiment of the present invention utilizing an internet enabled wireless device as the card information input device is shown. To begin the transaction, the cardholder 104 inputs his or her card information over a wireless device at stage 154 by way of the device keypad. The cardholder 104 is then prompted to enter a security code and/or other identifier(s). The cardholder 104 information is then routed through stage 156 to the internet 116. Once connected to the internet 116, the cardholder 104 information is routed via path 128 to the ATM/debit network 118. The ATM/debit network 118 then sends the information to issuer 102. The issuer 102 verifies the transaction and routes this information back to stage 154. Once the cardholder 104 is verified at stage 154, the cardholder 104 is then provided a number of options. These options include, but are not limited to, withdrawal, transfer, payment of bills and the like, such options to be selected on the keypad of the internet enabled wireless device.

If bill payment is chosen, the cardholder 104 is presented with a list of billers 106 that he or she has identified during the initial enrollment process (See FIG. 1a). The cardholder 104 selects the biller 106 for the bill he or she wishes to pay. The cardholder 104 enters the amount due and may or may not enter the payment date. A transaction is created to deduct the amount due from the cardholder's 104 electronic account and creates a credit to the biller's 106 account. This information is then routed through stage 132 to either an electronic bill pay network at 120 or a private bill pay network at 122. The bill pay network 120 or 122 will then forward this information to the indicated biller 106 at either stage 134 electronically or a paper check will be generated at stage 136 and forwarded by mail. Once the information is transmitted to biller 106, the counter device at stage 154 presents cardholder 104 with a confirmation number once the transaction is complete. The process is repeated until all bills are paid.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method for managing and processing stored-value debit, check card, signature debit, PIN based card or automatic teller machine (ATM) cards for bill payment comprising the steps of:

enrolling with a bill payment card issuer;
providing bill payment account information for each biller;
establishing a fund source through the card issuer;
issuing a card with identifying information to a cardholder;
inputting said identifying information from said card into an input device;
transmitting said information to said card issuer for verification;
routing verification from said card issuer;
providing a bill payment option regarding said fund source;
selecting said bill payment option;
providing a list of billers selected during enrollment;
selecting a biller for a desired bill to pay;
inputting data consistent with said selected bill payment option;
creating a transaction to deduct the amount of the bill from said fund source;
transmitting said transaction to said card issuer by way of a bill pay network;
processing said transaction consistent with said selected bill payment option;
providing an output to a biller consistent with said processed transaction.

2. The method for managing and processing stored-value debit, check card, signature debit, PIN based card or automatic teller machine (ATM) cards for bill payment of claim 1 further comprising the step of providing an output to said card holder consistent with said processed data.

3. The method for managing and processing stored-value debit, check card, signature debit, PIN based card or automatic teller machine (ATM) cards for bill payment of claim 2 wherein said transmitting steps occur by way of a standard telephone or internet network.

4. The method for managing and processing stored-value debit, check card, signature debit, PIN based card or automatic teller machine (ATM) cards for bill payment of claim 3 wherein said transmitting steps occur by way of an ATM/debit network.

5. The method for managing and processing stored-value debit, check card, signature debit, PIN based card or automatic teller machine (ATM) cards for bill payment of claim 4 further comprising routing said output to said biller by way of an electronic bill pay network.

6. The method for managing and processing stored-value debit, check card, signature debit, PIN based card or automatic teller machine (ATM) cards for bill payment of claim 5 wherein said input device is a swipe device.

7. The method for managing and processing stored-value debit, check card, signature debit, PIN based card or automatic teller machine (ATM) cards for bill payment of claim 5 wherein said input device is a non-swipe device.

8. The method for managing and processing stored-value debit, check card, signature debit, PIN based card or automatic teller machine (ATM) cards for bill payment of claim 5 wherein said input device is a personal computer.

9. The method for managing and processing stored-value debit, check card, signature debit, PIN based card or automatic teller machine (ATM) cards for bill payment of claim 5 wherein said input device is a kiosk.

10. The method for managing and processing stored-value debit, check card, signature debit, PIN based card or automatic teller machine (ATM) cards for bill payment of claim 5 wherein said input device is a wireless device.

11. The method for managing and processing stored-value debit, check card, signature debit, PIN based card or automatic teller machine (ATM) cards for bill payment of claim 5 wherein said input device is a telephone line based device.

12. The method for managing and processing stored-value debit, check card, signature debit, PIN based card or automatic teller machine (ATM) cards for bill payment of claim 5 wherein said input device is an automatic teller machine.

13. The method for managing and processing stored-value debit, check card, signature debit, PIN based card or automatic teller machine (ATM) cards for bill payment of claim 4 further comprising the step of routing said output to said biller by way of a private bill pay network.

14. The method for managing and processing stored-value debit, check card, signature debit, PIN based card or automatic teller machine (ATM) cards for bill payment of claim 13 wherein said input device is a swipe device.

15. The method for managing and processing stored-value debit, check card, signature debit, PIN based card or automatic teller machine (ATM) cards for bill payment of claim 13 wherein said input device is a non-swipe device.

16. The method for managing and processing stored-value debit, check card, signature debit, PIN based card or automatic teller machine (ATM) cards for bill payment of claim 13 wherein said input device is a personal computer.

17. The method for managing and processing stored-value debit, check card, signature debit, PIN based card or automatic teller machine (ATM) cards for bill payment of claim 13 wherein said input device is a kiosk.

18. The method for managing and processing stored-value debit, check card, signature debit, PiN based card or automatic teller machine (ATM) cards for bill payment of claim 13 wherein said input device is a wireless device.

19. The method for managing and processing stored-value debit, check card, signature debit, PIN based card or automatic teller machine (ATM) cards for bill payment of claim 13 wherein said input device is a telephone line based device.

20. The method for managing and processing stored-value debit, check card, signature debit, PIN based card or automatic teller machine (ATM) cards for bill payment of claim 13 wherein said input device is an automatic teller machine.

* * * * *